(12) United States Patent
Okayama

(10) Patent No.: US 6,215,922 B1
(45) Date of Patent: *Apr. 10, 2001

(54) LIGHTWAVE FILTER AND LIGHTWAVE SELECTIVE ROUTER

(75) Inventor: Hideaki Okayama, Tokyo (JP)

(73) Assignee: Oki Electric Industry Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/015,617

(22) Filed: Jan. 29, 1998

(30) Foreign Application Priority Data

Feb. 7, 1997 (JP) .................................................. 9-025398

(51) Int. Cl.$^7$ .................................................. G02B 6/293
(52) U.S. Cl. .................................. 385/24; 385/15; 385/37
(58) Field of Search ................................... 385/15, 24, 27, 385/37

(56) References Cited

U.S. PATENT DOCUMENTS

| | | | |
|---|---|---|---|
| 5,388,001 | 2/1995 | Okayama et al. | 359/629 |
| 5,446,809 | 8/1995 | Fritz et al. | 385/17 |
| 5,677,971 | 10/1997 | Okayama et al. | 385/11 |
| 5,841,918 | * 11/1998 | Li | 385/24 |
| 5,887,091 | * 3/1999 | Jabr et al. | 385/24 |
| 5,903,691 | * 5/1999 | Wisseman et al. | 385/37 |
| 5,920,413 | * 7/1999 | Miyakawa et al. | 385/24 X |

FOREIGN PATENT DOCUMENTS 0 730 172   2/1996   (EP).

OTHER PUBLICATIONS

L. Quentel et al., "Prgrammable Fiber Grating Based Wavelength Demultiplexer", OFC '96 Technical Digest, pp. 120–121, 1996. (no month given).

* cited by examiner

Primary Examiner—John D. Lee
(74) Attorney, Agent, or Firm—Wenderoth, Lind & Ponack, L.L.P.

(57) ABSTRACT

A lightwave filter which allows optical signals of a plurality of wavelength channels to be extracted even in the case of high-density multiplexing. It is provided with two rows of gratings, each with two fixed gratings, wherein the reflection wavelength is fixed, and two variable gratings, wherein the reflection wavelength can be shifted, connected rectilinearly to each other. It also has an optical circulator which guides optical signals of wavelength channels reflected by the first row of gratings to the second row of gratings. Of the variable gratings, the reflection wavelengths of those having basic reflection wavelengths which correspond to wavelength channels not selected from among the input optical signals are shifted to wavelengths other than the basic reflection wavelengths of the other variable gratings of the same row. This allows optical signals of selected wavelengths to be selected, while those of unselected wavelengths pass through.

29 Claims, 6 Drawing Sheets

LIGHTWAVE FILTER AND LIGHTWAVE SELECTIVE ROUTER

BACKGROUND TO THE INVENTION

1. Field of the Invention

The present invention relates to a lightwave filter which allows light signals with a plurality of lightwaves to be selected and extracted from a multiplexed light signal, and to a lightwave selective router which makes use of this.

2. Description of the Related Art

There are lightwave filters which allow light signals with a plurality of lightwaves to be selected and extracted from a multiplexed light signal. One example of a conventional lightwave filter of this sort is to be found in the preliminary collection of papers read at the International Conference on Optical Fiber Communication 1996 (Reference Material 1). The lightwave selective filter which is disclosed in this paper is configured by connecting a plurality of reflected lightwave variable gratings rectilinearly. The wavelength of the light signal which each grating reflects basically corresponds one by one to the wavelengths of the multiplexed light signal, and this reflection wavelength is known as the basic reflection wavelength. Since light signals can be allocated to them, each multiplexed wavelength is also referred to as a wavelength channel, irrespective of whether a light signal is actually allocated to it or not.

The reflected lightwave variable gratings are capable of shifting the wavelength of light signals which they reflect from the basic reflection wavelength to other new reflection wavelengths. A wavelength shifted in this manner is known as a shift wavelength.

When selecting a wavelength, a lightwave filter is able, by causing the reflection wavelength of the grating to shift from the basic reflection wavelength to a shift wavelength, to allow light signals of a specific wavelength through, while reflecting those of other wavelengths.

Moreover, in optical communications using multiplexed optical signals it is desirable, when a light signal of a specific wavelength has been isolated and extracted from a multiplexed optical signal, to ensure the effective use of wavelengths by inserting a new optical signal into the vacant wavelength channel. An example of a lightwave selective router which interchanges light signals of specific wavelengths from among multiplexed light signals of this sort is disclosed in the *Journal of Lightwave Technology* 14: 1320–40, 1996 (Reference Material 2). In the lightwave selective router illustrated in FIG. 17 of Reference Material 2 in particular, a wave-dividing element, whereby the multiplexed light signal is divided by wavelength channel, is connected along with a wave-joining element to each wavelength channel by means of optical fibers. A 2×2 optical switch is provided on the light propagation path of each optical fiber, enabling each wavelength channel's light signals to be inserted or isolated by the operation of these 2×2 switches.

However, in the case of high-density multiplexed light signals, the wavelength interval between neighboring wavelength channels is short. Thus, use of the lightwave filter described in the above-mentioned paper with, for instance, a high-density multiplex where the wavelength interval is about 1 nm would result in the shift wavelength from the basic reflection wavelength of one grating overlapping with the wavelength of the wavelength channel neighboring this basic reflection wavelength. In such a case, for instance, it becomes difficult to extract light signals of a plurality of neighboring wavelengths by allowing them to pass selectively through a lightwave filter. Otherwise, if a wavelength is to be prevented from overlapping neighboring wavelengths, it is necessary to shift the reflection wavelength into a wavelength band outside the multiplexed band.

For this reason, it has been hoped that a lightwave filter would materialize which would be capable of extracting light signals of a plurality of wavelengths even in the case of high-density multiplexing.

Moreover, the lightwave selective router which is described in the second paper mentioned above makes use of a 2×2 optical switch, but it has hitherto been impossible to obtain a 2×2 optical switch with a sufficiently high switching speed. What is more, 2×2 optical switches in general require a large amount of motive power, it is difficult to reduce crosstalk sufficiently to improve the accuracy of the selected wavelength, and they are dependent on polarization. Thus, the speed of switching wavelengths and the accuracy of the selected wavelength in conventional lightwave selective routers have been restricted by 2×2 optical switches. For this reason, it has been hoped that a new lightwave selective router would materialize which would not need to make use of a 2×2 optical switch.

SUMMARY OF THE INVENTION

A first aspect of the present invention provides a lightwave filter having an input port, an output port, an optical router unit connected to these input and output ports, and a plurality of rows of gratings each connected individually to this optical router unit. This lightwave filter has the following characteristics.

Each of the rows of gratings has a fixed reflection wavelength grating whereof the reflection wavelength is fixed, and a variable reflection wavelength grating whereby it is possible to shift the reflection wavelength from a basic reflection wavelength to another wavelength. These are connected to each other rectilinearly, and wavelengths are selected and reflected by both the fixed and variable gratings. The new reflection wavelength which results from shifting is known as the shift wavelength.

The optical router unit guides the input multiplexed optical signal from the input port to the first row of gratings. Optical signals which are reflected by the first row of gratings are guided to subsequent gratings. Those which are reflected by the last row are output towards the output port.

In each row of gratings the fixed and basic reflection wavelengths differ from each other. Each wavelength of an input optical signal matches in each row of gratings with either the fixed or the basic reflection wavelength. Each wavelength of an input optical signal also matches in each row of gratings with the basic reflection wavelength of one row. The shift wavelength of a given variable reflection wavelength grating is always a wavelength other than the one which is to be selected and reflected by that row of gratings.

In this manner, each row of gratings in this configuration of the lightwave filter comprises a variable reflection wavelength grating (hereinafter referred to also as a 'variable grating') and a fixed reflection wavelength grating (hereinafter referred to also as a 'fixed grating'). Thus, when selecting a wavelength it is possible to shift the reflection wavelength of the variable grating to a wavelength other than the basic reflection wavelength of the other variable gratings, which is to say to a shift wavelength (non-basic reflection wavelength). If this shift wavelength is, for instance, the reflection wavelength of a fixed grating, it is possible by shifting the reflection wavelength of the variable grating to ensure even with a high-density multiplexed optical signal that the optical signal of the desired specific wavelength is selected and reflected. Consequently, this selection and reflection is feasible, for instance, for all the multiplexed optical signals even with high-density multiplexing.

Moreover, the reflection wavelength of a variable grating during selection of wavelengths may be shifted, for instance, to a reflection wavelength of a fixed grating in the immediate vicinity of the basic reflection wavelength, so that there is no need to shift the reflection wavelength outside the multiplex band.

In the preferred embodiments, the lightwave filter to which the present invention pertains has an optical circulator as the optical router unit. This optical circulator has an input terminal, an output terminal and a plurality of input/output terminals, the input terminal being connected to the input port, the output terminal being connected to the output port, and each of the input/output terminals being each connected to one of the rows of gratings. This configuration makes for simplification of the structure of the lightwave filter, while allowing wavelength selection to be implemented correctly.

In the preferred embodiments of the lightwave filter to which the present invention pertains, the rows from the first row to the last row each comprise two rows of gratings, which both reflect the same wavelength, the optical router unit comprising a plurality of rows of directional couplers connected row by row one to each two rows of gratings, each of the directional couplers, except for the last row, being connected, the output terminal of the directional coupler of one row to the input terminal of the directional coupler of the next row, the input terminal of the directional coupler of the first row being connected to the input port, the output terminal of the directional coupler of the last row being connected to the output port, and each of the directional couplers having a coupling length such that the optical signals input from the row of gratings are output from the output terminal of the first directional coupler.

By using directional couplers in this manner as the optical router unit, it is possible to divide optical signals input through the input terminals of the directional couplers and guide them to the two rows of gratings, while guiding the optical signals input from the rows of gratings to the output ports of the directional couplers. This makes it possible to suppress loss in the optical signals which they are being guided.

In the lightwave filter to which the present invention pertains, it is also suitable, where one row contains a plurality of the variable reflection wavelength gratings, for the shift wavelength at earlier variable reflection wavelength gratings differs from the basic reflection wavelength at later variable reflection wavelength gratings.

In the lightwave filter to which the present invention pertains, it is further suitable for the rows of gratings to have these gratings arranged from the side of the optical router unit with the fixed reflection wavelength gratings first and the variable reflection wavelength gratings second, or in the opposite order.

In the lightwave filter to which the present invention pertains, it is also suitable for the rows of gratings have these gratings arranged from the side of the optical router unit with the variable reflection wavelength gratings and the fixed reflection wavelength gratings alternately.

In the lightwave filter to which the present invention pertains, the shift wavelength may be made to tally with the wavelength of the optical signal reflected by the fixed reflection wavelength gratings.

In the lightwave filter to which the present invention pertains, it is further suitable for the shift wavelength to be made to match with a wavelength between the longest and shortest wavelengths of the multiplexed wavelength.

In the lightwave filter to which the present invention pertains, each of the variable reflection wavelength gratings may be made to match with the basic reflection wavelength which differs from the wavelength of the optical signal which these reflect.

In the lightwave filter to which the present invention pertains, it is suitable for the fixed reflection wavelength gratings and variable reflection wavelength gratings contained in one of the rows to be arranged in the opposite order from the fixed reflection wavelength gratings and variable reflection wavelength gratings contained in another of the rows.

In the lightwave filter to which the present invention pertains, it is advisable for the end of the last grating which comprises the rows of gratings on the side which is not connected to the previous grating to be connected to a dummy port.

In the lightwave filter to which the present invention pertains, it is further advisable for the rows of gratings to comprise optical fibers and actuators which are capable of imparting tension to these optical fibers.

In the lightwave filter to which the present invention pertains, the rows of gratings may comprise optical fibers, capillaries which are located around these optical fibers, and means of heating which are located around these capillaries.

In the lightwave filter to which the present invention pertains, it is advisable for the capillaries to be formed of a material with a high thermal expansion coefficient.

A second aspect of the present invention provides a lightwave selective router having a first and second input port, a first and second output port, a plurality of rows of gratings and a first and second optical router unit, and possessing the following characteristics.

Each of the plurality of rows of gratings is configured in the same manner as the rows of gratings of the lightwave filter which has already been described.

The first optical router unit is configured in such a manner as to guide an input optical signal, wherein optical signals of a plurality of wavelengths are multiplexed, from the first input port to one end of the first row of gratings, optical signals of wavelengths which are reflected by the first row of gratings being guided from one end of this first row of gratings to one end of subsequent rows of gratings, the optical signals of a wavelength which is reflected by the last row being output towards the first output port as isolated optical signals.

The second optical router unit is configured in such a manner as to guide the isolated optical signals as inserted optical signals from the second input port to the other end of the first row of gratings, inserted optical signals of wavelengths which are reflected by the first row of gratings being guided from the other end of this first row of gratings to the other end of subsequent rows of gratings, the inserted optical signals of a wavelength which is reflected by the last row being output from the other end of this last row of gratings towards the second output port.

The reflection wavelength and the basic reflection wavelength in each row of gratings differ from each other.

Each wavelength of the input optical signal matches in each row of gratings with either the fixed reflection wavelength or the basic reflection wavelength.

Each wavelength of the input optical signal also matches with the basic reflection wavelength of one row.

The shift wavelength of a given variable reflection wavelength grating is always a wavelength other than the one which is to be selected and reflected by that row of gratings.

The configuration of the lightwave selective router in this manner facilitates the selection of wavelengths by inputting optical signals at both ends of each row of gratings. Thus, of optical signals input through the first input port, those of a common reflected wavelength, which are reflected selectively to one end of each of the rows of gratings, are output as isolated optical signals. Meanwhile, optical signals of wavelengths other than the common reflected wavelength pass through the rows of gratings and are output as residual optical signals to the second output port.

If inserted optical signals of wavelengths included in the common reflected wavelengths are inserted through the second input port, the inserted optical signals are reflected selectively to the other end in each row of gratings. As a result, the residual and inserted optical signals are output from the second output port as multiplexed signals.

Thus, the lightwave selective router to which the present invention pertains is of a novel and simple configuration which avoids the use of a 2×2 optical switch.

It is advisable for this lightwave selective router to which the present invention pertains to have a first optical circulator as the first optical router unit, this first optical circulator having a first input terminal, a first output terminal and a plurality of first input/output terminals, the first input terminal being connected to the first input port, the first output terminal being connected to the first output port, each of the first input/output terminals being each connected to one end of one of the rows of gratings, while the second optical circulator has a second input terminal, a second output terminal and a plurality of second input/output terminals, the second input terminal being connected to the second input port, the second output terminal being connected to the second output port, and each of the second input/output terminals being each connected to the other end of one of the rows of gratings.

In implementing both the lightwave filter and the lightwave selective router to which the present invention pertains, it is advisable for the configuration to be as described below. In other words, where one row contains a plurality of the variable reflection wavelength gratings, it is suitable for the shift wavelength at earlier variable reflection wavelength gratings to be one which differs from the basic reflection wavelength at later variable reflection wavelength gratings.

It is also suitable for the rows of gratings to have these gratings arranged from the side of the optical router unit with the fixed reflection wavelength gratings first and the variable reflection wavelength gratings second, or in the opposite order.

It is further advisable for the rows of gratings to have these gratings arranged from the side of the optical router unit with the variable reflection wavelength gratings and the fixed reflection wavelength gratings alternately.

The shift wavelength may be made to tally with the wavelength of the optical signal reflected by the fixed reflection wavelength gratings.

It is also suitable for the shift wavelength to be made to match with a wavelength between the longest and shortest wavelengths of the multiplexed wavelength.

It is advisable for each of the variable reflection wavelength gratings to be made to match with the basic reflection wavelength which differs from the wavelength of the optical signal which these reflect.

It is further suitable for the fixed reflection wavelength gratings and variable reflection wavelength gratings contained in one of the rows to be arranged in the opposite order from the fixed reflection wavelength gratings and variable reflection wavelength gratings contained in another of the rows.

It is advisable for the other end of the last grating which comprises the rows of gratings on the side which is not connected to the previous grating to be connected to a dummy port.

It is advisable for the rows of gratings to comprise optical fibers and actuators which are capable of imparting tension to these optical fibers.

The rows of gratings may comprise optical fibers, capillaries which are located around these optical fibers, and means of heating which are located around these capillaries.

It is also advisable for the capillaries are to be formed of a material with a high thermal expansion coefficient.

It should be added that in these inventions the basic reflection wavelength may, for instance, a wavelength in a state wherein the wavelength of the variable grating is not shifted, but it is not restricted to this. It may also, for instance, be a wavelength in a state wherein a backward bias has been impressed on the variable grating and shifted a fixed amount from the reflection wavelength in a state wherein no backward bias is impressed.

BRIEF DESCRIPTION OF THE DRAWINGS

The foregoings and other objects, features and advantages of the present invention will be better understood from the following description taken in connection with the accompanying drawings, in which.

DESCRIPTION OF THE PREFERRED EMBODIMENTS

There follow, with reference to the drawings, descriptions of examples of the lightwave filter and lightwave selective router which form the invention to which the present application pertains. In the reference drawings, the size, shape and locational relationship of the constituent parts are only represented in outline in a manner sufficient to facilitate the understanding of these inventions. Consequently, it is to be understood that these inventions are in no way restricted by the examples shown.

First Embodiment

Figure 1:
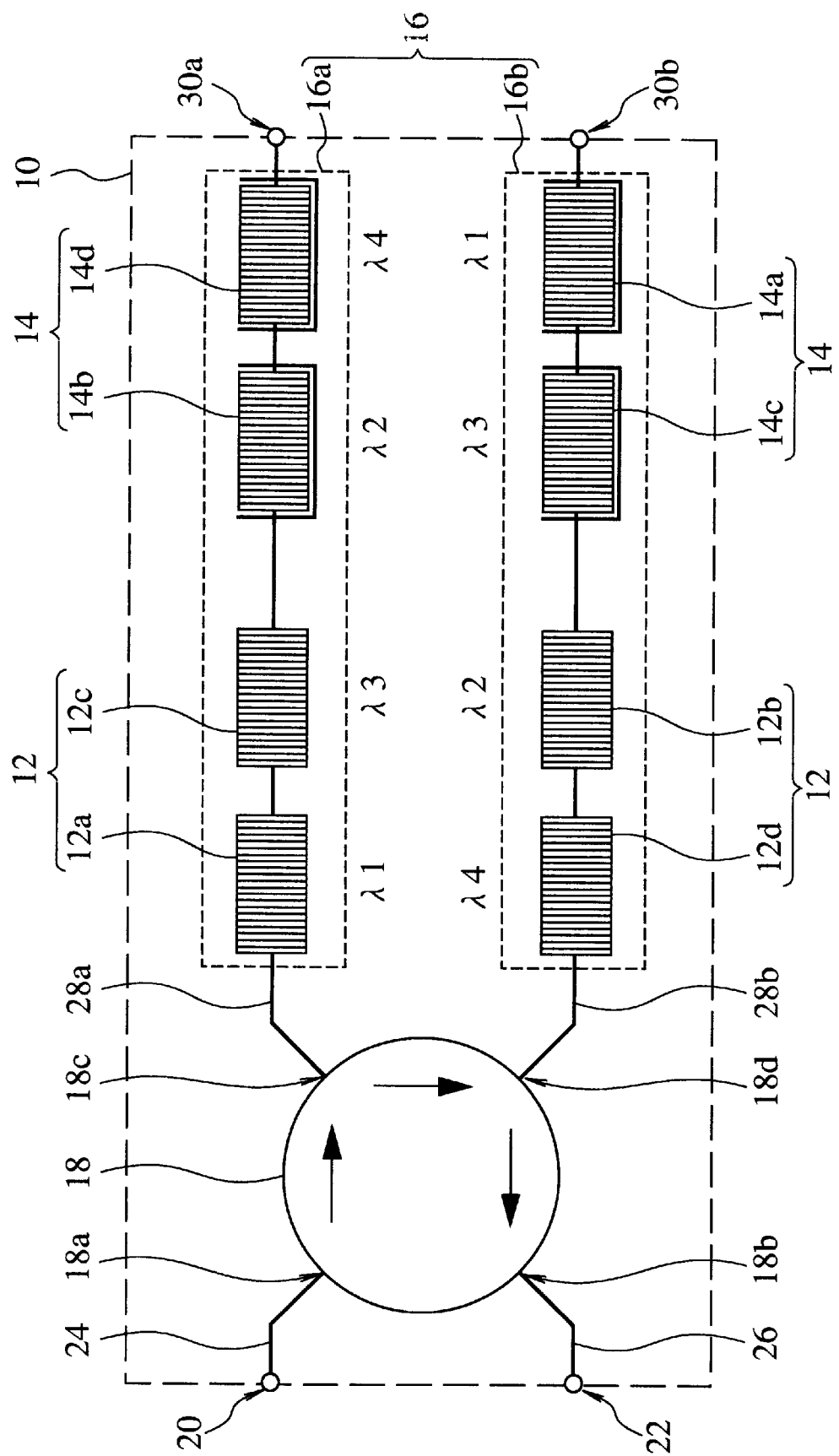
FIG. 1 is a block diagram for use in describing the first embodiment of the lightwave filter to which the present invention pertains.

A first embodiment of the lightwave filter to which the present invention pertains will now be described with reference to FIG. 1. FIG. 1 is a block diagram for use in describing the first embodiment of the lightwave filter to which the present invention pertains.

This lightwave filter 10 has an input port 20, an output port 22, a plurality of (for instance) gratings in two rows 16a and 16b, and an optical router unit 18. Each of the rows of gratings 16a and 16b has fixed reflection wavelength gratings (hereinafter also referred to as 'fixed gratings') 12, whereof the reflection wavelength is fixed, and variable reflection wavelength gratings (hereinafter also referred to as 'variable gratings') 14, whereof the reflection wavelength is variable. Both rows of gratings 16a and 16b are configured in such a manner that the wavelength of the optical signals which they reflect can be selected and reflected. In this example, fixed gratings 12 are connected (optically linked) rectilinearly in two rows, each with two gratings 12a and 12c, 12d and 12b respectively. Similarly, variable gratings 14 are connected (optically linked) rectilinearly in two rows, each with two gratings 14b and 14d, 14c and 14a respectively. The fixed gratings 12 and variable gratings 14 are also connected rectilinearly.

Each grating 12a–12d of the fixed gratings 12, as is well known, is fixed in regard to the wavelength of the optical signals which it reflects. This reflection wavelength will be referred to here as a 'fixed reflection wavelength'. Conversely, each grating 14a–14d of the variable gratings 14, as is well known, is initially set in regard to the wavelength of the optical signals which it reflects (basic reflection wavelength), but this can be shifted as required to reflection wavelengths other than the basic reflection wavelength. This shifted and newly set reflection wavelength will be referred to here as a 'shift wavelength'.

In each of the first and second rows of gratings 16a and 16b, the reflection wavelength of the fixed gratings 12 and the basic reflection wavelength of the variable gratings 14 differ from each other. As has already been explained, the reflection wavelength of the variable gratings 14 (14a–14b) in the state wherein it is not shifted is regarded as the basic reflection wavelength. The basic reflection wavelengths differ between each of the variable gratings 14a–14b, and bear a one-to-one relationship to one of the wavelengths of the multiplexed optical signals which are input into this lightwave filter. For example, supposing that the multiplexed wavelengths are $\lambda_1$, $\lambda_2$, $\lambda_3$ and $\lambda_4$ the basic reflection wavelengths of the gratings 14a, 14b, 14c and 14d are set to $\lambda_1, \lambda_2, \lambda_3$ and $\lambda_4$, respectively.

Moreover, the multiplexed wavelengths are $\lambda_1, \lambda_2, \lambda_3$ and $\lambda_4$ bear a one-to-one relationship in each of the rows of gratings 16a and 16b to the reflection wavelength of one of the gratings which constitute that row, namely with one of the fixed reflection wavelengths or one of the basic reflection wavelengths. In this example, the gratings 12a, 12c, 14b and 14d correspond to the wavelengths $\lambda_1$, $\lambda_3$, $\lambda_2$ and $\lambda_4$ respectively, while the gratings 12d, 12b, 14c and 14a correspond to the wavelengths $\lambda_4, \lambda_2, \lambda_3$ and $\lambda_1$ respectively.

Furthermore, the shift wavelengths of the variable gratings in some rows of gratings are set to the wavelength of an optical signal which is to be reflected by that row of gratings, namely to a wavelength which differs from that which is to be selected. Thus, in this example, the shift wavelengths of the variable gratings 14b and 14d of the first row of gratings 16a are set at wavelengths other than $\lambda_1$, and $\lambda_3$, while the shift wavelengths of the variable gratings 14c and 14a of the second row of gratings 16b are set at wavelengths other than $\lambda_4$ and $\lambda_2$.

The optical router unit 18 has the function of guiding the optical signals which are input into the input port 20 to the first row of gratings, and guiding the reflected optical signals from this row of gratings to the next row, and so on in order up to the last row of gratings, where optical signals of a wavelength which is reflected are output towards the output port 22.

In this example, an optical circulator is employed as the optical router unit 18. This optical circulator 18 has an input terminal 18a, an output terminal 18b, a first input/output terminal 18c, and a second input/output terminal 18d. The input terminal 18a is connected by way of an input optical fiber 24 to the input port 20. Similarly, the output terminal 18b is connected by way of an output optical fiber 26 to the input port 22. Likewise the first input/output terminal 18c is connected by way of first input/output optical fibers 28a to the first row of gratings 16a, while the second input/output terminal 18d is connected by way of second input/output optical fibers 28b to the second row of gratings 16b. In the drawing, the rows of gratings 16a and 16b are denoted as a whole by means of the code 16.

The first row of gratings 16a has as the fixed gratings 12 the first fixed grating 12a and the third fixed grating 12c. As has already been explained, the first fixed grating 12a selectively reflects optical signals of the wavelength $\lambda_1$, while the third fixed grating 12c selectively reflects optical signals of the wavelength $\lambda_3$.

Moreover, the first row of gratings 16a has as the variable gratings 14 the second variable grating 14b and the third fixed grating 14d. As has already been explained, the second variable grating 14b reflects optical signals of the wavelength $\lambda_2$ as a basic reflection wavelength, while the fourth variable grating 14d reflects optical signals of the wavelength $\lambda_4$ as a basic reflection wavelength.

In the first row of gratings 16a, the first fixed grating 12a, the third fixed grating 12c, the second variable grating 14b and the fourth variable grating 14d are connected rectilinearly in order from the side on which the optical circulator 18 is located. The fact that the fixed gratings 12 are connected in this manner to the side on which the optical circulator 18 is located allows the optical signals to be reflected with priority by the fixed gratings 12 when the reflection wavelengths which are obtained by shifting as a result of shifting with the variable gratings 14, namely the shift wavelengths, correspond to the reflection wavelengths of the fixed gratings 12.

In this example, optical signals which are not reflected by a grating pass through it. At the opposite end of the first row of gratings 16a from the optical circulator 18 is located a first dummy port 30a. Optical signals of wavelengths which were not reflected by any of the gratings in the first row of gratings 16a are output from the first dummy port 30a.

The second row of gratings 16b has as the fixed grating 12 the second fixed grating 12b and the fourth fixed grating 12d. In this configuration, as has already been explained, the second fixed grating 12b selectively reflects optical signals of the wavelength $\lambda_2$, while the fourth fixed grating 12d selectively reflects optical signals of the wavelength $\lambda_4$.

Moreover, the second row of gratings 16b has as the variable gratings 14 the first variable grating 14a and the third variable grating 14c. As already explained, the first variable grating 14a reflects optical signals of the wavelength $\lambda_1$ as a basic reflection wavelength, while the third variable grating 14c reflects optical signals of the wavelength $\lambda_3$ as a basic reflection wavelength.

In the second row of gratings 16b, the fourth fixed grating 12d, the second fixed grating 12b, the third variable grating 14c and the first variable grating 14a are connected rectilinearly in order from the side on which the optical circulator 18 is located.

Thus, the gratings in the first row of gratings 16a and the second row of gratings 16b are arranged in such a manner that the order of reflection wavelength and basic reflection wavelength from the side on which the optical circulator 18 is located is reversed. The fact that the gratings in the first and second rows of gratings 16a and 16b are arranged in reverse order in this manner means that, supposing optical signals of a plurality of wavelength channels are reflected together, it is possible to reduce the difference in length between the light-paths along which these reflected optical signals pass. By reducing the difference in length of lightpath between the wavelength channels in this manner is possible to even out the delay in optical signals between them.

Optical signals which are not reflected by a grating pass through it. In this example, at the opposite end of the second row of gratings 16b from the optical circulator 18 is located a second dummy port 30b. Optical signals of wavelengths which were not reflected by any of the gratings in the second row of gratings 16b are output from the second dummy port 30b.

As has already been explained, the wavelength channels $\lambda_1, \lambda_2, \lambda_3$ and $\lambda_4$ of the input optical signals match in the first and second rows either with the reflection wavelength of a fixed grating 12 or with the basic reflection wavelength of a variable grating 14, the two types of grating which constitute the rows of gratings 16. Thus, optical signals of the wavelength channels $\lambda_1, \lambda_2, \lambda_3$ and $\lambda_4$ are reflected by both rows of gratings 16a and 16b if the reflection frequencies of the variable gratings are not switched.

Moreover, as has already been explained, the wavelength channels $\lambda_1, \lambda_2, \lambda_3$ and $\lambda_4$ of the input optical signals match with the basic reflection wavelength of one of the variable gratings 14 which constitute the rows of gratings 16a and 16b. Thus, optical signals of each wavelength channel are reflected at least once by a variable grating if the reflection frequencies of the variable gratings are not switched.

This lightwave filter 10 allows those of the input optical signals which are not selected and reflected to pass through. In this case, the reflection wavelengths of those of the variable gratings 14 which have basic reflection wavelengths corresponding to the wavelength channels of those of the input optical signals which are not selected and reflected are shifted to a wavelength other than the basic wavelengths of the other variable grating of the same row. For example, supposing that the wavelength $\lambda_4$ is not selected, the reflection wavelength of the variable grating 14d is shifted from the basic reflection wavelength $\lambda_4$ to a shift wavelength. This shift wavelength differs from the basic reflection wavelength $\lambda_2$ of the other variable grating 14b.

This allows optical signals of the unselected wavelength channel $\lambda_4$ to pass through the variable grating 14d, of which the reflected wavelength has been shifted, and be output to the dummy port 30a. Thus, no optical signals of any wavelength channel are output to the output port 22 if there is even one row of gratings which fails to select and reflect that wavelength channel.

Methods of shifting the reflection wavelength of a variable grating include, for instance, the use of a PZT (lead zirconate titanate) actuator as described in Reference Material 1 above. A bias is impressed on to the PZT actuator in order to impart tension to the optical fibers which form the grating. The photoelastic effect causes the index of refraction of the optical fibers to change, making it possible to shift the reflection wavelength of the variable grating. The reflection wavelength of the variable grating when the bias is not being impressed on the actuator, that is, basic reflection wavelength is also known as the selective wavelength at zero bias.

Figure 2:
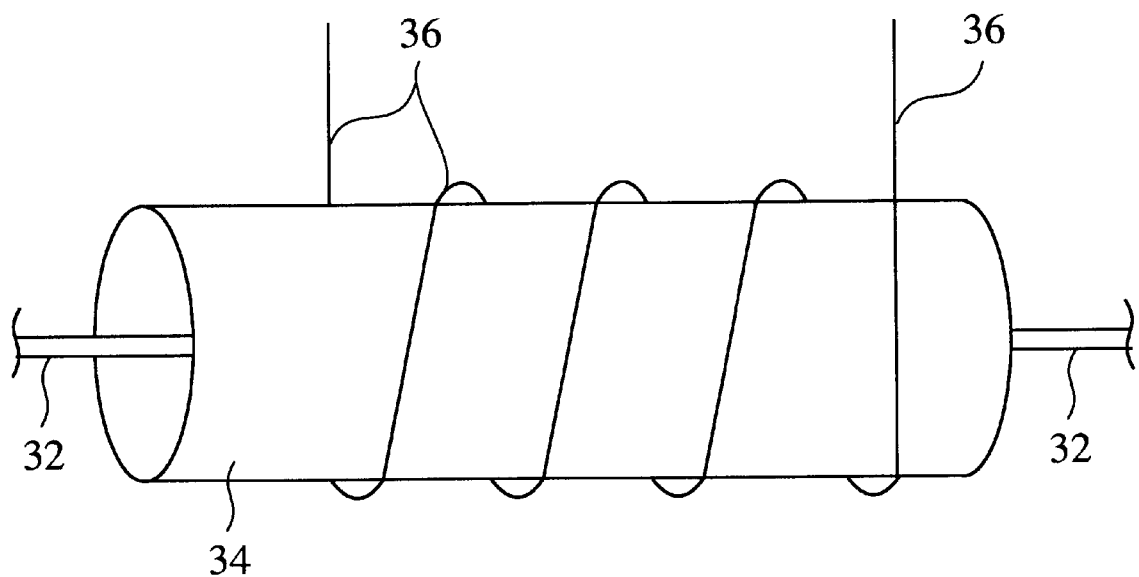
FIG. 2 is a block diagram for use in describing a wavelength-variable grating which utilises a thermooptical effect, and is suitable for use in the lightwave which the present invention pertains.
Figure 3A:
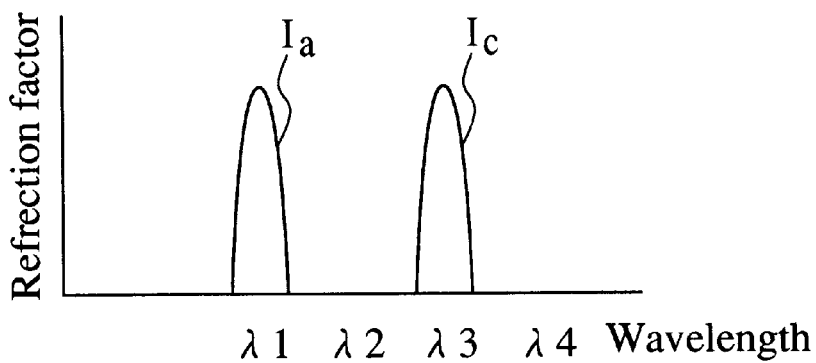
FIG. 3(A)–(D) are graphs for use in describing the reflection characteristics of a grating which is suitable for use in the lightwave filter to which the present invention pertains.
Figure 3B:
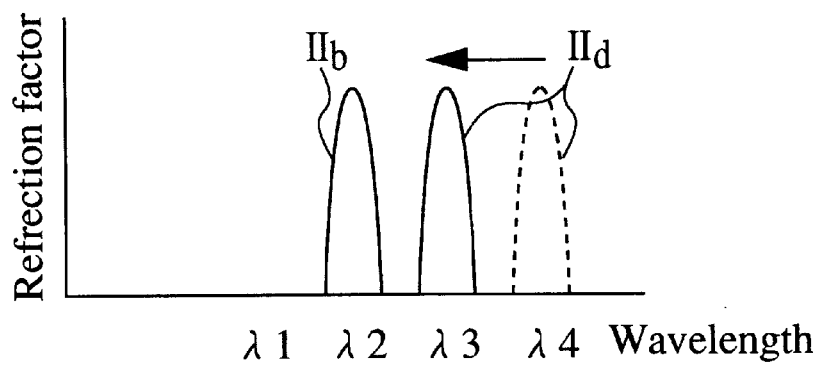
Figure 3C:
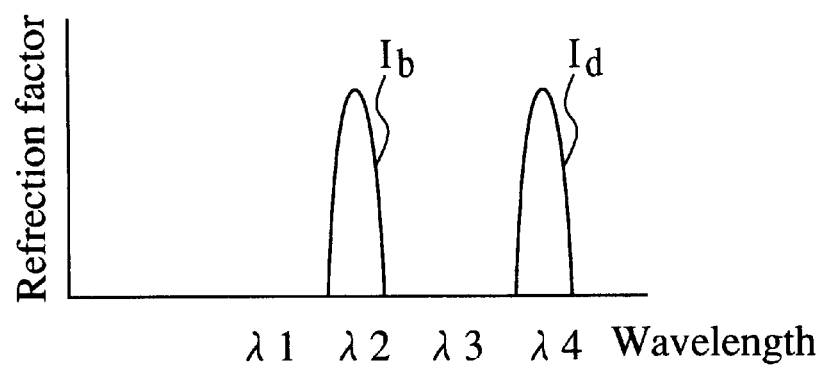
Figure 3D:
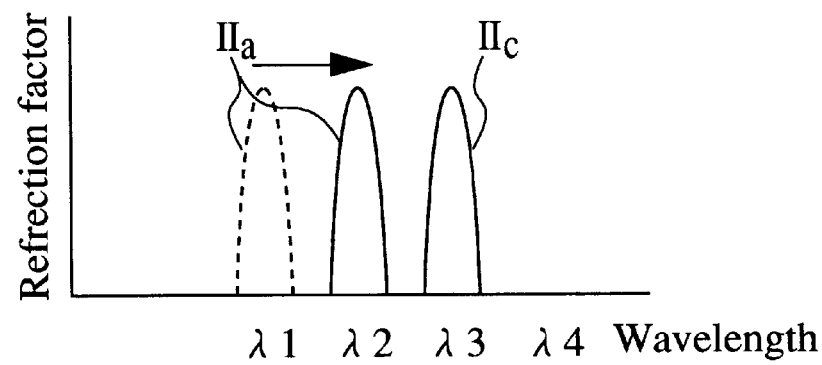

Another method of shifting the reflection wavelength of a variable grating, for instance, makes use of thermooptical effect. FIG. 2 is a block diagram of such a variable grating. This variable grating is configured in such a manner that the optical fibers 32 of which the grating is formed pass through a tubular center shaft within a tubular quartz capillary 34. Around this capillary 34 is wound an electric heater 36. By using the electric heater 36 to impart partial heat to the optical fibers 32 within the capillary 34, it is possible to change the index of refraction of part of the optical fibers 32, thus shifting the reflection wavelength of the variable grating.

Alternatively, the capillary 34 is constructed of a material with a high thermal expansion coefficient, and the optical fiber 32 is anchored at both ends of the capillary 34. By heating the capillary 34 and causing it to expand, and by imparting tension to the optical fiber 32, it is possible to effect a partial change in the index of refraction of part of the optical fibers 32, thus shifting the reflection wavelength of the variable grating.

There follows a description of an example whereby optical signals of the wavelengths $\lambda_2$ and $\lambda_3$ are selected from an input optical signal wherein the wavelengths $\lambda_1, \lambda_2, \lambda_3$ and $\lambda_4$ are multiplexed.

The input optical signal from the input port 20 is introduced by way of the input optical fibers 24 through the input terminal 18a to the optical circulator 18. The optical circulator 18 outputs the input signal through the first input/output terminal 18c. The input signal is then introduced by way of the first input/output optical fibers 28a into the first row of gratings 16a.

FIG. 3 (A)–(B) depicts the reflection characteristics of gratings in the first row of gratings 16a. In each graph the horizontal axis represents the wavelength (in the desired units), while the vertical axis represents the reflection factor (in the desired units). FIG. 3 (A) shows the reflective characteristics of the first and third fixed gratings 12a and 12c by means of the respective curves Ia and Ic. Similarly, FIG. 3 (B) shows the reflective characteristics of the second and fourth variable gratings 14b and 14d by means of the respective curves IIb and IId.

In the first row of gratings 16a, the reflection wavelength of the fourth variable grating 14d has been shifted from the basic reflection wavelength $\lambda_4$ represented by the broken line IId to the wavelength $\lambda_3$ represented by the unbroken line IId (FIG. 3 (B)). This means that optical signals of the wavelength $\lambda_4$ pass through the first row of gratings 16a and are output to the first dummy port 30a.

In the first row of gratings 16a, optical signals of the wavelength $\lambda_1$ are reflected by the first fixed grating 12a. Similarly, optical signals of the wavelength $\lambda_2$ are reflected by the second fixed grating 12b, and those of the wavelength $\lambda_3$ by the third fixed grating 12c. As a result, the first row of gratings 16a reflects only optical signals of the wavelengths $\lambda_1, \lambda_2,$ and $\lambda_3$ back to the optical circulator 18. The reflection wavelength of the fourth variable grating 14 may be shifted from the basic reflection wavelength $\lambda_4$ further towards the long wave side.

The optical circulator inputs the wavelengths $\lambda_1$, $\lambda_2$, and $\lambda_3$, which have been reflected by the first row of gratings 16a, to the second row of gratings 16b.

FIG. 3 (C)–(D) depicts the reflection characteristics of gratings in the second row of gratings 16b. In each graph the horizontal axis represents the wavelength (in the desired units), while the vertical axis represents the reflection factor (in the desired units). FIG. 3 (C) shows the reflective characteristics of the second and fourth fixed gratings 12b and 12d by means of the respective curves Ib and Id. Similarly, FIG. 3 (D) shows the reflective characteristics of the first and third variable gratings 14a and 14c by means of the respective curves IIa and IIc.

In the second row of gratings 16b, the reflection wavelength of the first variable grating 14a has been shifted from the basic reflection wavelength $\lambda_1$ represented by the broken line IIa to the wavelength $\lambda_2$ represented by the unbroken line IIa (FIG. 3 (D)). This means that optical signals of the wavelength $\lambda_1$, pass through the second row of gratings 16b and are output to the second dummy port 30b.

In the second row of gratings 16b, optical signals of the wavelength $\lambda_2$ are reflected by the second fixed grating 12b. Similarly, optical signals of the wavelength $\lambda_3$ are reflected by the third fixed grating 12c. As a result, the second row of gratings 16b reflects only optical signals of the wavelengths $\lambda_2$ and $\lambda_3$ back to the optical circulator 18.

The optical circulator outputs the wavelengths $\lambda_2$ and $\lambda_3$, which have been reflected by both the first and seconds row of gratings 16a and 16b, to the output port 22.

Thus, the rows of gratings in this embodiment of the lightwave filter 10 each comprise both variable gratings and fixed gratings. With this configuration, the reflection wavelength of a variable grating can be shifted from its basic reflection wavelength to a wavelength other than the basic reflection wavelength of the other variable gratings in order to prevent optical signals of unselected wavelengths from being reflected from the rows of gratings to the optical router unit 18 during selection of wavelengths. As a result, this embodiment of the lightwave filter 10 facilitates the selection of wavelengths by shifting the wavelengths of the variable gratings, even with high-density multiplexed optical signals where the interval between wavelengths is approximately 1 nm. It is thus possible, for instance, to select all the multiplexed optical signals even with high-density multiplexing.

Moreover, in the first and second rows of gratings 16a and 16b in this embodiment of the invention, the gratings 12 and 14 are arranged in such a manner that the wavelength channels of the basic reflection wavelengths of the variable gratings 14 (14b and 14d; 14c and 14a) and those of the fixed gratings 12 (12a and 12c; 12d and 12b) are in a specific order from the side on which the optical router unit 18 is located. However, according to design the gratings can also be arranged in such a manner that the reflection wavelengths of a plurality of variable gratings are in a suitable order. For example, the reflection wavelength channels of the variable gratings can be arranged so as to form a continuum from short to long. In such a case it is possible for the shift wavelength of a given variable grating to jump over the basic reflection wavelength of the variable grating which precedes it, and to be shifted to the reflection wavelength of the nearest fixed grating. In the same way, it is possible to shift the reflection wavelength of a variable grating outside the multiplex zone.

Second Embodiment

Figure 4:
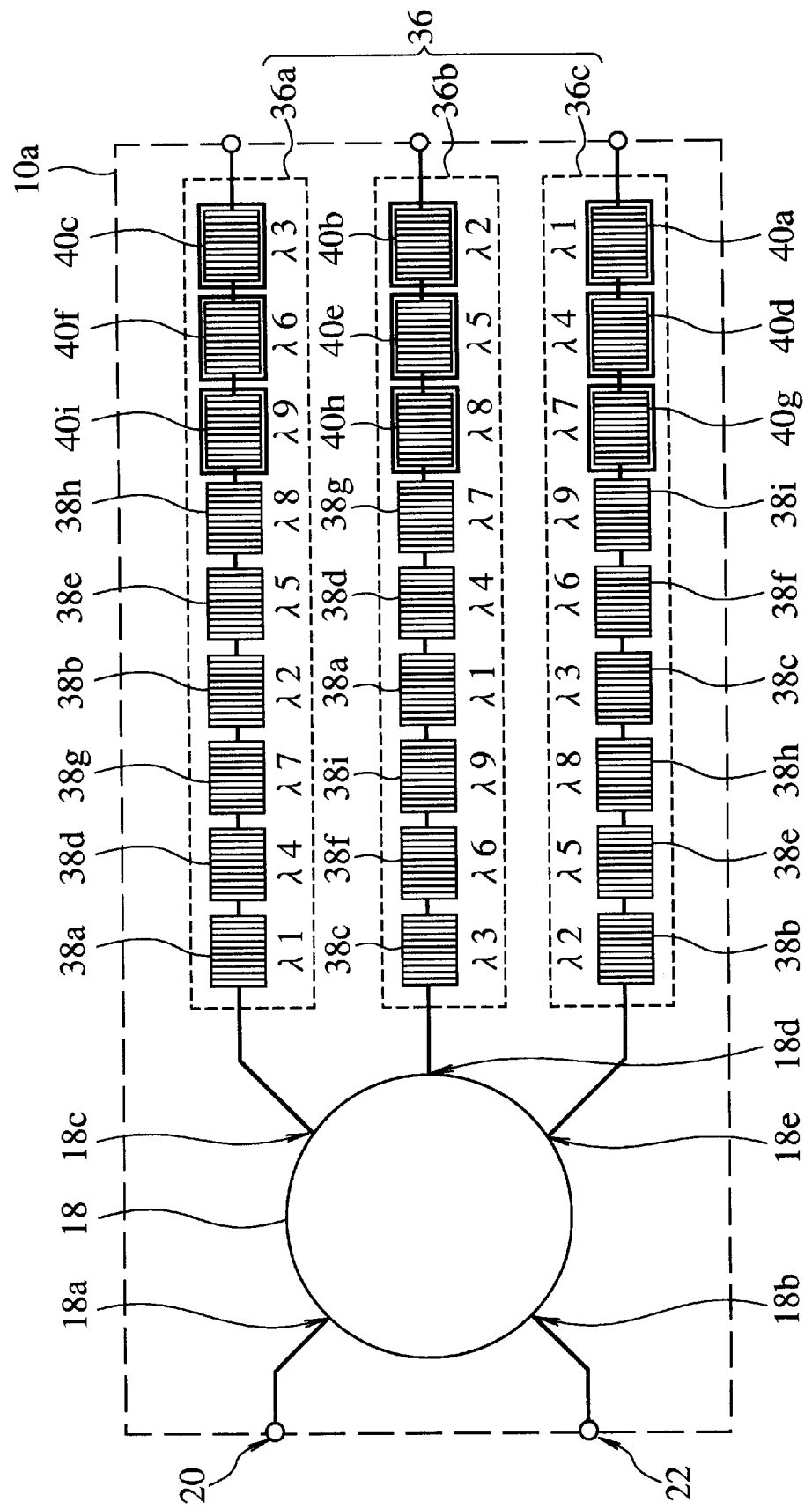
FIG. 4 is a block diagram for use in describing the embodiment of the lightwave which the present invention pertains.

A second embodiment of the lightwave filter to which the present invention pertains will now be described with reference to FIG. 4. FIG. 4 is a block diagram for use in describing the second embodiment of the lightwave filter to which the present invention pertains. In the drawing, those constituent parts which are the same as those of the first embodiment of the lightwave filter to which the present invention pertains have been allocated the same codes, and a detailed description of them will be omitted.

In this example, the lightwave filter 10a has three rows of gratings 36 (36a, 36b, 36c). The first row of gratings 36a is connected to the first input/output terminal 18c of the optical circulator. Similarly, the second row of gratings 36b is connected to the second input/output terminal 18d of the optical circulator, while the third row of gratings 36c is connected to the third input/output terminal 18e.

The first row of gratings 36a comprises, in order from the side on which the optical circulator 18 is located, a first, fourth, seventh, second, fifth and eighth fixed grating (38a, 38d, 38g, 38b, 38e and 38h) which reflect optical signals of the wavelengths $\lambda_1$, $\lambda_4$, $\lambda_7$, $\lambda_2$, $\lambda_5$ and $\lambda_8$, and a ninth, sixth and third variable grating (40i, 40f and 40c) which have the basic reflection wavelengths $\lambda_9$, $\lambda_6$ and $\lambda_3$.

The second row of gratings 36b comprises, in order from the side on which the optical circulator 18 is located, a third, sixth, ninth, first, fourth and seventh fixed grating (38c, 38f, 38i, 38a, 38d and 38g) which reflect optical signals of the wavelengths $\lambda_3$, $\lambda_6$, $\lambda_9$, $\lambda_1$, $\lambda_4$ and $\lambda_7$, and an eighth, fifth and second variable grating (40h, 40e and 40b) which have the basic reflection wavelengths $\lambda_8$, $\lambda_5$ and $\lambda_2$.

The third row of gratings 36c comprises, in order from the side on which the optical circulator 18 is located, a second, fifth, eighth, third, sixth and ninth fixed grating (38b, 38e, 38h, 38c, 38f and 38i) which reflect optical signals of the wavelengths $\lambda_2$, $\lambda_5$, $\lambda_8$, $\lambda_3$, $\lambda_6$ and $\lambda_9$, and a seventh, fourth and first variable grating (40g, 40d and 40a) which have the basic reflection wavelengths $\lambda_7$, $\lambda_4$ and $\lambda_1$.

The action of the second embodiment of the lightwave filter is the same as that of the first, and a detailed description will therefore be omitted. However, a brief explanation will be given based on the an example where optical signals of the wavelengths $\lambda_2$ and $\lambda_6$ are selected and output from an optical signal input into the lightwave filter wherein wavelengths from $\lambda_1$ to $\lambda_9$ are multiplexed.

The reflection wavelengths of the ninth, third, eighth, fifth, seventh, fourth and first variable gratings 40i, 40c, 40h, 40e, 40g, 40d and 40a are shifted in advance to a suitable shift wavelength.

The input optical signal from the input port 20 is introduced by way of the input terminal 18a and first input/output terminal 18c of the optical circulator 18 into the first row of gratings 36a. Optical signals of the wavelengths $\lambda_1$, $\lambda_4$, $\lambda_7$, $\lambda_2$, $\lambda_5$ and $\lambda_8$ are reflected by the fixed gratings 38a, 38d, 38g, 38b, 38e and 38h, while the wavelength $\lambda_6$ is reflected by the variable grating 40f and returns to the first input/output terminal 18c. Meanwhile, optical signals of the wavelengths $\lambda_3$ and $\lambda_9$ pass through this first row of gratings 37a.

These reflected signals are input by way of the second input/output output terminal 18d into the second row of gratings 36b. Optical signals of the wavelengths $\lambda_5$ and $\lambda_8$ pass through the second row of gratings 36b, while those of the residual wavelengths $\lambda_1$, $\lambda_4$, $\lambda_7$, $\lambda_2$ and $\lambda_6$ are reflected and return to second input/output terminal 18d.

These reflected signals are input by way of the third input/output terminal 18e into the third row of gratings 36c.

Optical signals of the wavelengths $\lambda_7$, $\lambda_4$ and $\lambda_1$ pass through the third row of gratings 36c, so that only those of the wavelengths $\lambda_2$ and $\lambda_6$ are selected and reflected. These reflected optical signals are fed from the third input/output terminal 18e to the output terminal 18b, whence they are output to the output port 22.

It remains to be pointed out that in this second embodiment the provision of a third row of gratings makes for a greater reduction in crosstalk than where there are only two rows.

Third Embodiment

Figure 5:
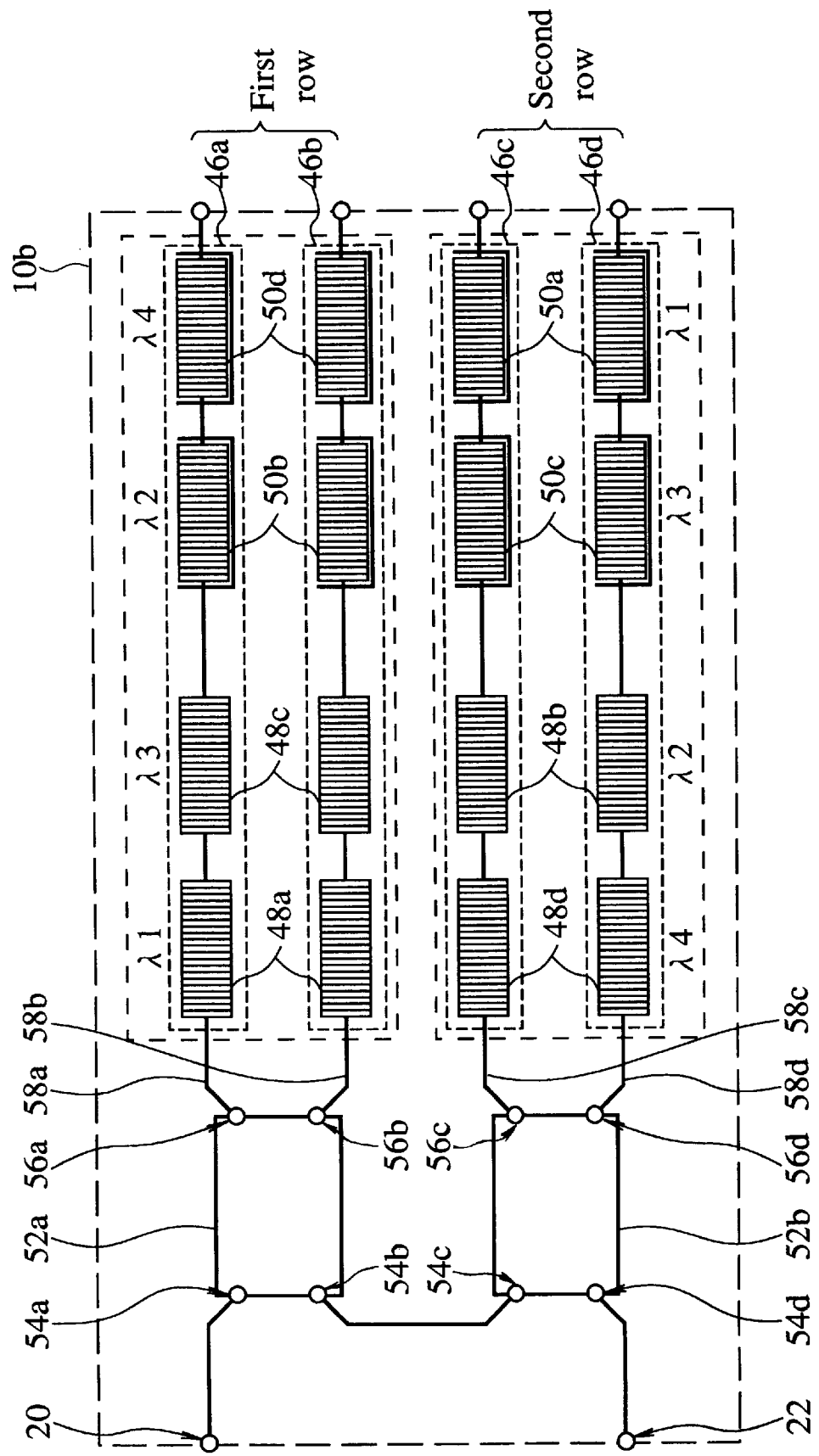
FIG. 5 is block diagram for use in describing the third embodiment of the lightwave filter to which the present invention pertains.

A third embodiment of the lightwave filter to which the present invention pertains will now be described with reference to FIG. 5. FIG. 5 is a block diagram for use in describing the third embodiment of the lightwave filter to which the present invention pertains.

The lightwave filter 10b of this example comprises two rows each of gratings which reflect the same wavelengths as each other. Here, the first row actually consists of a first and second row of gratings 46a and 46b. In each of the first and second rows of gratings 46a and 46b, a first and third fixed grating 48a and 48c which reflect respectively the wavelengths $\lambda_1$ and $\lambda_3$, and a second and fourth variable grating 50b and 50d with the respective basic reflection wavelengths $\lambda_2$ and $\lambda_4$ are connected in order.

In this example, the second row actually consists of a third and fourth row of gratings 46c and 46d. In each of the third and fourth rows of gratings 46c and 46d, a fourth and second fixed grating 48d and 48a which reflect respectively the wavelengths $\lambda_4$ and $\lambda_2$, and a third and first variable grating 50c and 50a with the respective basic reflection wavelengths $\lambda_3$ and $\lambda_1$ are connected in order.

In this example, the optical router unit consists of two rows of directional couplers, each of which is connected to two rows of gratings. A first row of directional couplers 52a has at one end an input terminal 54a and an output terminal 54b, while at the other end it has a first input/output terminal 56a and a second input/output terminal 56b. The first input/output terminal 56a of the first directional coupler 52a is connected by way of first input optical fibers 58a to the first row of gratings 46a. Meanwhile, the second input/output terminal 56b of the first directional coupler 52a is connected by way of second input optical fibers 58b to the second row of gratings 46b.

Similarly, a second row of directional couplers 52b has at one end an input terminal 54c and an output terminal 54d, while at the other end it has a first input/output terminal 56c and a second input/output terminal 56d. The first input/output terminal 56c of the second directional coupler 52b is connected by way of first input optical fibers 58c to the third row of gratings 46c. Meanwhile, the second input/output terminal 56d of the second directional coupler 52b is connected by way of fourth input optical fibers 58d to the fourth row of gratings 46d.

The output terminals of both the first and second directional couplers 52a and 52b, with the exception of the last rows, are connected respectively to the input terminal of the next row of directional couplers. The output terminal 54b of the first directional coupler 52a is connected to the input terminal 54a of the second directional coupler 52b. The input terminal 54a of the first directional coupler 52a which forms the first row is connected to the input port 20. Similarly, the output terminal 54d of the second directional coupler 52b which forms the last row is connected to the output port 22.

The first directional coupler 52a has a coupling length which is suitable for outputting from its output terminal 54b optical signals input respectively from the first and second rows of gratings 46a and 46b. Similarly, the second directional coupler 52b has a coupling length which is suitable for outputting from its output terminal 54d optical signals which are input respectively from the third and fourth rows of gratings 46c and 46d. This coupling length is preferably set, for instance, at one half of the complete coupling length.

Use of a directional coupler in this manner as the optical router unit facilitates suppression of the outputting of optical signals input from the first and second rows of gratings to the input terminals 54a and 54c of the directional couplers 52a and 52b. This means that it is possible to suppress loss of intensity of the optical signal while guiding it.

This third embodiment of the lightwave filter 10b makes use of the directional couplers 52a and 52b as router units. As is well known, directional couplers allow input optical signals to be propagated to each of a plurality of input/output terminals provided. Consequently, the power of the optical signal which it is sought to output decreases if they are connected to only one row of gratings. It is for this reason that two identical rows of gratings 46a and 46b are provided at the respective input/output terminals 56a and 56b of the first directional coupler 52a. In the same manner, two identical rows of gratings 46c and 46d are provided at the respective input/output terminals 56c and 56d of the second directional coupler 52b. In particular, the two variable gratings 50b, which form a pair in the first row of gratings, are configured in such a manner as to shift wavelength simultaneously. In the same manner, the other variable gratings 50d, 50c and 50a which form pairs are configured in such a manner that each pair shifts wavelengths simultaneously.

With the exception of the fact that both members of a pair of variable gratings shift reflection wavelength simultaneously when one member with the same basic reflection wavelength in each row does so, the action of the lightwave filter according to the third embodiment is essentially the same as that according to the first embodiment described above. In other words, when a multiplexed optical signal is input from the input port 20 into the lightwave filter 10b, this optical signal is introduced from the input terminal 54a of the first directional coupler 52a to the first and second input/output terminals 56a and 56b, whence it is input into the first and second rows of gratings 46a and 46b. The two rows of gratings 46a and 46b are of identical configuration, with the result that optical signals of the same reflection wavelength are selected and reflected from both. These reflected optical signals come together from the first and second input/output terminals 56a and 56b at the output terminal 54b, whence they are input into the first input terminal 54c of the second directional coupler 52b. The input optical signals are introduced in the same manner to the first and second input/output terminals 56c and 56d, whence they are input into the third and fourth rows of gratings 46c and 46d. The two rows of gratings 46c and 46d are of identical configuration, with the result that optical signals of the same reflection wavelength are selected and reflected from both. Consequently, the reflected optical signals from the two gratings 56c and 56d come together from the first and second input/output terminals 56c and 56d at the output terminal 54d, whence they are output to the output port 22.

Fourth Embodiment

Figure 6:
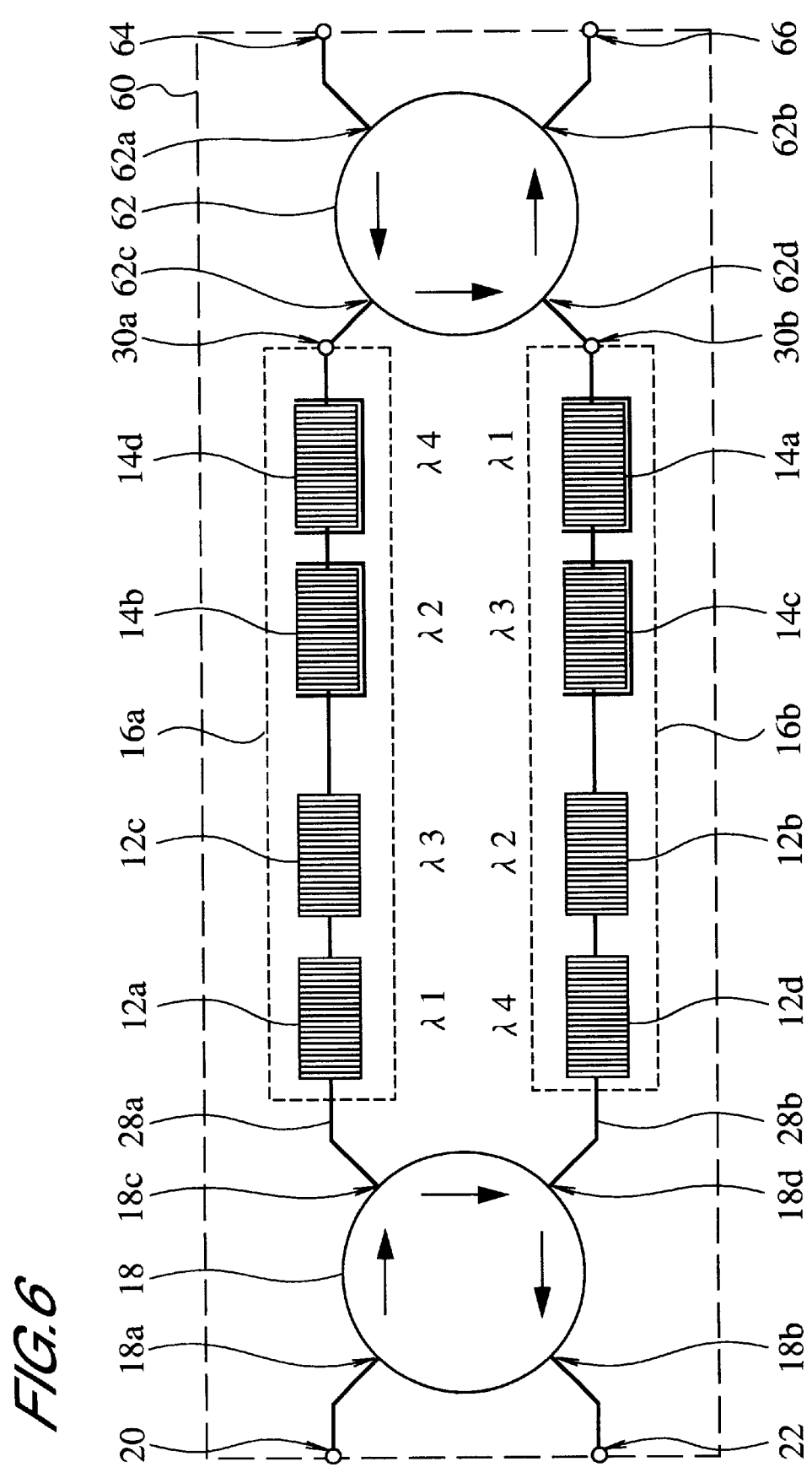
FIG. 6 is lock diagram for use in describing the fourth embodiment the lightwave filter to which the present invention pertains.

A fourth embodiment of the lightwave filter to which the present invention pertains will now be described with reference to FIG. 6. FIG. 6 is a block diagram for use in describing the fourth embodiment of the lightwave filter to which the present invention pertains.

In the fourth embodiment, a lightwave selective router 60 corresponds to a configuration wherein a second optical circulator is connected to the first and second dummy ports 30a and 30b of the lightwave filter 10 of the first embodiment. In this example, those constituent parts which are the same as those of the first embodiment have been allocated the same codes.

In this example, the lightwave selective router 60 has a second optical circulator as a second router unit 62. This second optical circulator 62 has an input terminal 62a, an output terminal 62b, and first and second input/output terminals 62c and 62d. The input terminal 62a is connected to a second input port 64. Similarly, the output terminal 62b is connected to a second output port 66. Meanwhile, the first input/output terminal 62c is connected by way of the first dummy port 30a to the other end of the first row of gratings 16a, and the second input/output terminal 62d is connected by way of the second dummy port 30b to the other end of the second row of gratings 16b.

There now follows a description of an example where from an input multiplexed optical signal of the wavelengths $\lambda_1$, $\lambda_2$, $\lambda_3$ and $\lambda_4$ the wavelengths $\lambda_2$ and $\lambda_3$ are output to the output port as isolated signals, while the residual optical signals of the wavelengths $\lambda_1$ and $\lambda_4$ and the inserted optical signals of the wavelengths $\lambda_2$ and $\lambda_3$ (which have been inserted from the second input port 64) are multiplexed and output to the second output port 66.

Firstly, optical signals of the wavelengths $\lambda_2$ and $\lambda_3$ are selected from the input optical signal of wavelengths $\lambda_1$–$\lambda_4$ by the same action as in the first embodiment, and then output to the output port 22. The optical signal of the wavelength $\lambda_4$, which was not selected, is input by way of the first dummy port 30a to the first input/output terminal 62c of the second optical circulator 62. Similarly, the optical signal of the wavelength $\lambda_1$, which was not selected, is input by way of the second dummy port 30b to the second input/output terminal 62d of the second optical circulator 62.

Meanwhile, the new optical signals of the wavelengths $\lambda_2$ and $\lambda_3$ are inserted as inserted optical signals from the second input port 64, and these inserted optical signals are reflected from both the first and second rows of gratings 16a and 16b. Consequently, the residual optical signals of the wavelengths $\lambda_1$ and $\lambda_4$, and the inserted optical signals $\lambda_2$ and $\lambda_3$ are multiplexed in the optical circulator 62, and output from the output terminal 62 to the second output port 66.

Using the lightwave selective router 60 in this manner allows wavelengths to be selected by inputting optical signals from both ends of the rows of gratings 16a and 16b. Thus, from an optical signal input from the first input port 20, it is possible to output as isolated signals from the first output port 22 optical signals with common reflection wavelengths which have been reflected selectively by the rows of gratings 16a and 16b to the side where the first optical circulator 18 is located. From input optical signals it is also possible for those of wavelengths other than the common reflected wavelength to pass through the rows of gratings and be output as residual optical signals to the second output port 66.

Here, if inserted optical signals of wavelengths which are included in the common reflected wavelengths are introduced from the second input port 64, these inserted optical signals are reflected selectively by the rows of gratings 16a and 16b to the side where the second circulator 62 is located. Thus, the residual wavelengths and the inserted wavelengths are multiplexed and output from the second output port 66.

Consequently, by using the lightwave selective router of this embodiment it is possible to provide a lightwave selective router of a novel and simple configuration which avoids the use of a 2×2 optical switch.

The lightwave filter to which the present invention pertains comprises rows of gratings each consisting of fixed and variable gratings. As a result, it is possible in selecting wavelengths to shift the reflected wavelength of the variable gratings to a wavelength other than the basic reflection wavelength of the other variable gratings. By 'a wavelength other than the basic reflection wavelength of the other variable gratings' is meant, for instance, the reflection wavelength of a fixed grating. As a result, the lightwave filter to which the present invention pertains makes it possible, even in the case of high-density multiplexed signals, for wavelengths to be selected by shifting the reflection wavelengths of the variable gratings. For this reason, even in the case of high-density multiplexed signals, it is possible to select all the multiplexed signals.

Moreover, since in selecting wavelengths the reflection wavelengths of the variable gratings may be shifted, for instance, as far as the reflection wavelength of the nearest fixed grating, there is no need to shift them outside the multiplex zone.

Furthermore, use of directional couplers as optical routers allows loss of intensity of the optical signals to be suppressed when guiding them.

In addition, use of the lightwave selective router to which the present invention pertains makes it possible to select wavelengths by inputting optical signals from both ends of the rows of gratings. Thus, of the optical signals input from the first input port, those of a common reflected wavelength which are reflected by each row to one end of the grating are output as isolated signals. Meanwhile, those of a wavelength other than the common reflected wavelength pass though one of the gratings and are output as residual signals to the second output port.

Here, if inserted optical signals of wavelengths which are included in the common reflected wavelengths are introduced from the second input port, these inserted optical signals are reflected selectively by the rows of gratings. Thus, the residual wavelengths and the inserted wavelengths are multiplexed and output from the second output port.

Consequently, by using the lightwave selective router to which the present invention pertains it is possible to provide a lightwave selective router of a novel and simple configuration which avoids the use of a 2×2 optical switch.

What is claimed is:

1. A lightwave filter comprising:

an input port;

an output port;

a plurality of rows of gratings; and an optical router unit, each of said plurality of rows of gratings having fixed reflection wavelength gratings each having a reflected wavelength of optical signals that is fixed as a fixed reflection wavelength, and variable reflection wavelength gratings each having a reflection wavelength that can be shifted from a basic reflection wavelength to another reflection wavelength (hereinafter referred to also as a 'shift wavelength'), said fixed reflection wavelength gratings and said variable reflection wavelength gratings being connected to each other rectilinearly and each of said rows of gratings reflecting optical signals of selected wavelength, said optical router unit guiding an input optical signal, wherein optical signals of a plurality of wavelengths are multiplexed, from said input port to the first row of gratings, optical signals of wavelengths which are reflected by the first row of gratings being guided to subsequent rows of gratings, those which are reflected by the last row being output towards the output port, said reflection wavelength and said basic reflection wavelength in each row of gratings differing from each other, each wavelength of said input optical signal matching in each row of gratings with either the fixed reflection wavelength or the basic reflection wavelength, each wavelength of said input optical signal also matching with said basic reflection wavelength of one row.

2. The lightwave filter according to claim 1, wherein said optical router unit comprises an optical circulator, said optical circulator having an input terminal, an output terminal and a plurality of input/output terminals, said input terminal being connected to said input port, said output terminal being connected to said output port, and each of said input/output terminals being each connected to one of said rows of gratings.

3. The lightwave filter according to claim 1, wherein said rows from the first row to the last row each comprises two rows of gratings, which both reflect the same wavelength, said optical router unit comprising a plurality of rows of directional couplers connected row by row one to each two rows of gratings, each of said directional couplers, except for the last row, being connected, the output terminal of the directional coupler of one row to the input terminal of the directional coupler of the next row, the input terminal of the directional coupler of the first row being connected to said input port, the output terminal of the directional coupler of the last row being connected to said output port, and each of said directional couplers having a coupling length such that said optical signals input from said row of gratings are output from the output terminal of said first directional coupler.

4. The lightwave filter according to claim 1, wherein, in a case where one row includes a plurality of said variable reflection wavelength gratings, said shift wavelength at earlier variable reflection wavelength gratings differs from the basic reflection wavelength at later variable reflection wavelength gratings.

5. The lightwave filter according to claim 1, wherein said rows of gratings have the gratings arranged from the side of said optical router unit with said fixed reflection wavelength gratings first and said variable reflection wavelength gratings second.

6. The lightwave filter according to claim 1, wherein said rows of gratings have the gratings arranged from the side of said optical router unit with said variable reflection wavelength gratings first and said fixed reflection wavelength gratings second.

7. The lightwave filter according to claim 1, wherein said rows of gratings have the gratings arranged from the side of said optical router unit with said variable reflection wavelength gratings and said fixed reflection wavelength gratings alternately.

8. The lightwave filter according to claim 1, wherein said shift wavelength is made to match with the wavelength of the optical signal reflected by the fixed reflection wavelength gratings.

9. The lightwave filter according to claim 1, wherein said shift wavelength is made to match with a wavelength between the longest and shortest wavelengths of said multiplexed wavelength.

10. The lightwave filter according to claim 1, wherein each of said variable reflection wavelength gratings is made to match with said basic reflection wavelength which differs from the wavelength of the optical signal which these reflect.

11. The lightwave filter according to claim 1, wherein said fixed reflection wavelength gratings and variable reflection wavelength gratings included in one of said rows are arranged in the opposite order from said fixed reflection wavelength gratings and variable reflection wavelength gratings contained in another of said rows.

12. The lightwave filter according to claim 1, wherein the end of the last grating which comprises said rows of gratings on the side which is not connected to the previous grating, is connected to a dummy port.

13. The lightwave filter according to claim 1, wherein said rows of gratings comprise optical fibers and actuators which are capable of imparting tension to these optical fibers.

14. The lightwave filter according to claim 1, wherein said rows of gratings comprise optical fibers, capillaries which are located around these optical fibers, and means for heating which are located around these capillaries.

15. The lightwave filter according to claim 14, wherein said capillaries are formed of a material with a high thermal expansion coefficient.

16. A lightwave selective router comprising:

a first and second input port;

a first and second output port;

a plurality of rows of gratings; and a first and second optical router unit, each of said plurality of rows of gratings having fixed reflection wavelength gratings each having a reflected wavelength of optical signals that is fixed as a fixed reflection wavelength, and variable reflection wavelength gratings each having a reflection wavelength that can be shifted from a basic reflection wavelength to another reflection wavelength (hereinafter referred to also as a 'shift wavelength'), said fixed reflection wavelength gratings and said variable reflection wavelength gratings being connected to each other rectilinearly and each of said rows of gratings reflecting optical signals of selected wavelength, said first optical router unit guiding an input optical signal, wherein optical signals of a plurality of wavelengths are multiplexed, from said first input port to one end of the first row of gratings, optical signals of wavelengths which are reflected by the first row of gratings being guided from one end of this first row of gratings to one end of subsequent rows of gratings, the optical signal of a wavelength which is reflected by the last row being output towards said first output port as separate optical signals, said second optical router unit guiding said separate optical signals as inserted optical signals from said second input port to the other end of the first row of gratings, inserted optical signals of wavelengths which are reflected by the first row of gratings being guided from the other end of this first row of gratings to the other end of subsequent rows of gratings, the inserted optical signals of a wavelength which is reflected by the last row being output from the other end of this last row of gratings towards said second output port, said reflection wavelength and said basic reflection wavelength in each row of gratings differing from each other, each wavelength of said input optical signal matching in each row of gratings with either the fixed reflection wavelength or the basic reflection wavelength, each wavelength of said input optical signal also matching with said basic reflection wavelength of one row.

17. The lightwave selective router according to claim 16, wherein said first optical router unit comprises a first optical circulator, said first optical circulator having a first input terminal, a first output terminal and a plurality of first input/output terminals, said first input terminal being connected to said first input port, said first output terminal being connected to said first output port, each of said first input/output terminals being each connected to one end of one of said rows of gratings, while the second optical circulator has a second input terminal, a second output terminal and a plurality of second input/output terminals, said second input terminal being connected to said second input port, said second output terminal being connected to said second output port, and each of said second input/output terminals being each connected to the other end of one of said rows of gratings.

18. The lightwave selective router according to claim 16, wherein, in a case where one row includes a plurality of said variable reflection wavelength gratings, said shift wavelength at earlier variable reflection wavelength gratings is one which differs from the basic reflection wavelength at later variable reflection wavelength gratings.

19. The lightwave selective router according to claim 16, wherein said rows of gratings have the gratings arranged from the side of said first or second optical router unit with said fixed reflection wavelength gratings first and said variable reflection wavelength gratings second.

20. The lightwave selective router according to claim 16, wherein said rows of gratings have the gratings arranged from the side of said first or second optical router unit with said variable reflection wavelength gratings first and said fixed reflection wavelength gratings second.

21. The lightwave selective router according to claim 16, wherein said rows of gratings have the gratings arranged from the side of said first or second optical router unit with said variable reflection wavelength gratings and said fixed reflection wavelength gratings alternately.

22. The lightwave selective router according to claim 16, wherein said shift wavelength is made to match with the wavelength of the optical signal reflected by the fixed reflection wavelength gratings.

23. The lightwave selective router according to claim 16, wherein said shift wavelength is made to match with a wavelength between the longest and shortest wavelengths of said multiplexed wavelength.

24. The lightwave selective router according to claim 16, wherein each of said variable reflection wavelength gratings is made to match with said basic reflection wavelength which differs from the wavelength of the optical signal which these reflect.

25. The lightwave selective router according to claim 16, wherein said fixed reflection wavelength gratings and variable reflection wavelength gratings are included in one of said rows being arranged in the opposite order from said fixed reflection wavelength gratings and variable reflection wavelength gratings contained in another of said rows.

26. The lightwave selective router according to claim 16, wherein the other end of the last grating which comprises said rows of gratings on the side which is not connected to the previous grating is connected to a dummy port.

27. The lightwave selective router according to claim 16, wherein said rows of gratings comprise optical fibers and actuators which are capable of imparting tension to these optical fibers.

28. The lightwave selective router according to claim 16, wherein said rows of gratings comprise optical fibers, capillaries which are located around these optical fibers, and means for heating which are located around these capillaries.

29. The lightwave selective router according to claim 28, wherein said capillaries are formed of a material with a high thermal expansion coefficient.

* * * * *